(12) United States Patent  
Winstead (10) Patent No.: US 7,518,547 B2  
(45) Date of Patent: Apr. 14, 2009

(54) METHOD AND SYSTEM OF INTERFERENCE DETECTION FOR RADAR ALTIMETERS

(75) Inventor: Benjamin J. Winstead, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 84 days.

(21) Appl. No.: 11/778,442

(22) Filed: Jul. 16, 2007

(65) Prior Publication Data

US 2009/0021418 A1 Jan. 22, 2009

(51) Int. Cl.
G01S 13/08 (2006.01)

(52) U.S. Cl. .................. 342/120; 342/94; 342/137; 342/159

(58) Field of Classification Search ......... 342/120–123, 342/137, 94, 159
See application file for complete search history.

(56) References Cited

U.S. PATENT DOCUMENTS

| 4,077,038 A | 2/1978 | Heller et al. | |
| 4,079,376 A | 3/1978 | Kirk, Jr. | |
| 4,103,302 A * | 7/1978 | Roeder et al. | 342/113 |
| 4,106,017 A * | 8/1978 | Roeder et al. | 342/88 |
| 4,739,330 A * | 4/1988 | Lazarus | 342/122 |
| 4,816,834 A * | 3/1989 | Bjorke | 342/120 |
| 5,150,125 A * | 9/1992 | Hager | 342/120 |
| 5,502,448 A | 3/1996 | Cantrell et al. | |
| 5,719,582 A * | 2/1998 | Gray | 342/120 |
| 6,177,904 B1 | 1/2001 | Coenen et al. | |
| 6,670,914 B1 | 12/2003 | Najarian et al. | |
| 6,753,806 B1 * | 6/2004 | Hager et al. | 342/169 |
| 6,897,804 B1 * | 5/2005 | Hager et al. | 342/120 |
| 2004/0033778 A1 | 2/2004 | Tsien | |
| 2004/0066323 A1 | 4/2004 | Richter | |
| 2004/0095269 A1 | 5/2004 | Uehara et al. | |
| 2004/0239559 A1 | 12/2004 | King et al. | |
| 2005/0059364 A1 | 3/2005 | Hansen et al. | |
| 2007/0030931 A1 | 2/2007 | Arambepola | |
| 2007/0273572 A1 * | 11/2007 | Thomas et al. | 342/68 |
| 2008/0246648 A1 * | 10/2008 | Winstead et al. | 342/94 |

* cited by examiner

Primary Examiner—John B Sotomayor  
(74) Attorney, Agent, or Firm—Fogg & Powers LLC (57) ABSTRACT

A method of detecting interference noise at a radar altimeter. The method comprises periodically emitting a pulse from the pulsed radar altimeter, periodically detecting a noise level in a noise gate, and determining if the noise level detected during each noise-level-detection period exceeds a noise threshold. The period of emitting the pulse is a pulse repetition interval and the noise gate is offset from other gates in the altimeter. If the noise level detected during a noise-level-detection period is greater than the noise threshold, a counter value is incremented by a selected incremental value for that noise-level-detection period and it is determined if the counter value is greater than a count threshold.

20 Claims, 7 Drawing Sheets

METHOD AND SYSTEM OF INTERFERENCE DETECTION FOR RADAR ALTIMETERS

BACKGROUND

A typical radio frequency receiver is not able to determine if detected noise is thermal white noise or if the noise is due to interference from another radio frequency source. If the noise is not thermal white noise, the operation of the radio frequency receiver can be degraded due to the interference changing the level of the background noise of the radio frequency receiver by an unknown amount.

If interference noise at the radio frequency receiver of a radar altimeter causes the altimeter to indicate an erroneous altitude to the user of airborne vehicle and if the pilot is not aware that the altimeter readings are incorrect, then the airborne vehicle is more prone to be in an accident.

SUMMARY

In a first aspect, a method of detecting interference noise at a radar altimeter comprises periodically emitting a pulse from the pulsed radar altimeter, periodically detecting a noise level in a noise gate, and determining if the noise level detected during each noise-level-detection period exceeds a noise threshold. The time period between the start times of consecutively emitted pulses is a pulse repetition interval (PRI) and the noise gate is offset from other gates in the altimeter. If the noise level detected during a noise-level-detection period is greater than the noise threshold, a counter value is incremented by a selected incremental value for that noise-level-detection period and it is determined if the counter value is greater than a count threshold.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

This invention provides a method and system to detect interfering signals at a pulsed radar altimeter. Typically interfering signals are emitted from another radio frequency source such as another radar altimeter, a ground-based radar site, or an airborne radar system. The pulsed radar altimeter periodically detects gated noise samples during a time frame in which the pulsed radar altimeter is not transmitting. If the change in signal level between a current noise sample and a previous noise sample exceeds a threshold, the pulsed radar altimeter determines that it is receiving non-white interference noise (also referred to herein as an interference noise) in an interference event. When a specific number of interference events occur in a given time, an interference detection is indicated. The pulsed radar altimeter can then take appropriate action to deal with the interfering noise in order to prevent an accident.

Figure 1:
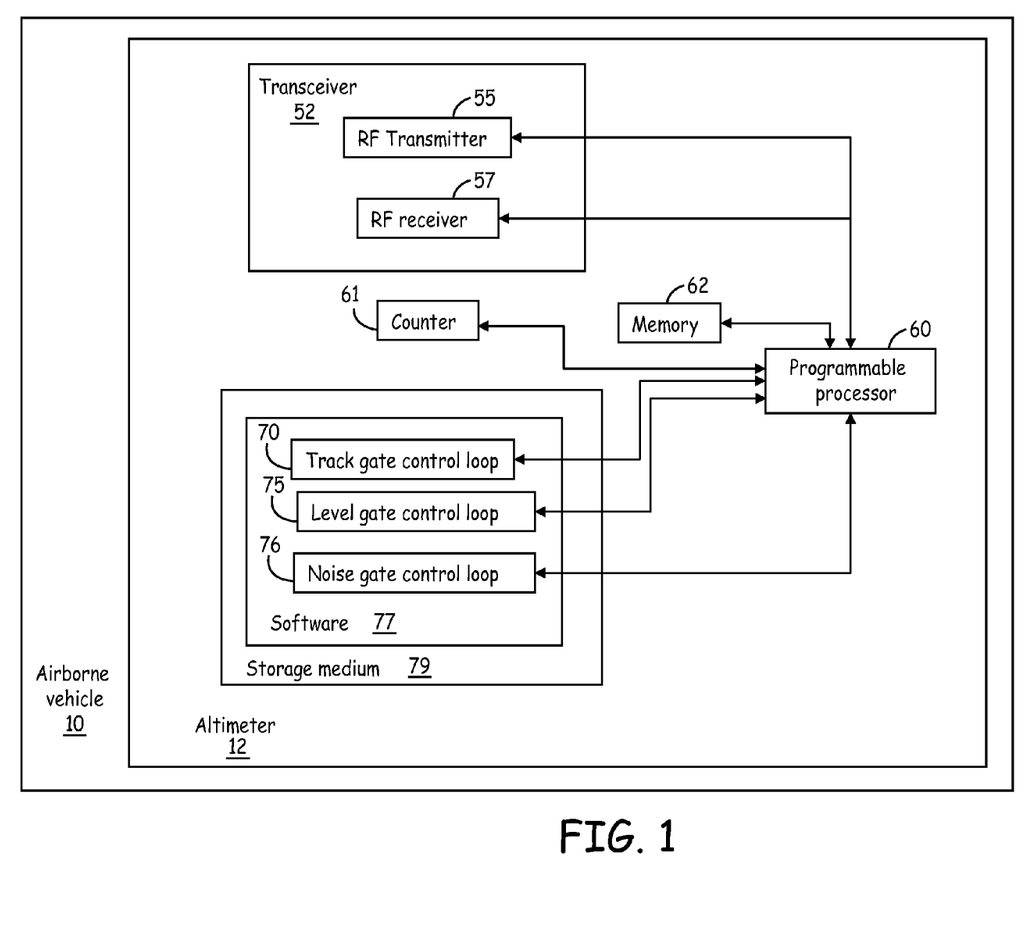
FIG. 1 is a block diagram of an interference detecting pulsed radar altimeter.

FIG. 1 is a block diagram of one embodiment of an interference detecting pulsed radar altimeter 12 in an airborne vehicle 10. The interference detecting pulsed radar altimeter 12 (also referred to herein as "altimeter 12" and "pulsed radar altimeter 12") reduces interference noise in accordance with the present invention.

The altimeter 12 includes a programmable processor 60, a memory 62, a radio frequency receiver 57, a radio frequency transmitter 55, a counter 61, and software 77 stored or otherwise embodied in or on a storage medium 79. The radio frequency receiver 57 and the radio frequency transmitter 55 comprise a transceiver 52. The software 77 includes a track gate control loop 70, a level gate control loop 75 and a noise gate control loop 76. The term software includes instructions, such as software, firmware or other program code.

The programmable processor 60 is communicatively coupled to the memory 62, the counter 61, the track gate control loop 70, the level gate control loop 75, the noise gate control loop 76, the radio frequency receiver 57, and the radio frequency transmitter 55. Depending on the overall system design, the programmable processor 60 is configured to automatically control the gain of the radio frequency receiver 57, the output power of the radio frequency transmitter 52, or a combination of both.

The programmable processor 60 determines if the noise level detected during each noise-level-detection period exceeds a noise threshold. If the noise level detected during a noise-level-detection period is greater than the noise threshold, the programmable processor 60 increments a counter value in the counter 61 by a selected incremental value for that noise-level-detection period. The programmable processor 60 also determines if a current counter value is greater than a count threshold. If the counter value is greater than the count threshold, the programmable processor indicates that an interference noise is present. In one implementation of this embodiment, the programmable processor 60 adjusts at least one parameter of the pulsed radar altimeter 12 if the counter value exceeds the count threshold.

The storage medium 79 tangibly embodies program instructions for execution by the programmable processor 60. The programmable processor 60 executes a program of instructions to perform specified functions by operating on input data and generating appropriate output. The programmable processor 60 receives instructions and data from the memory 62 such as a read-only memory and/or a random access memory. The software 77 comprises various elements of software, such as the track gate control loop 70, the level gate control loop 75, and the noise gate control loop 76, each including the computer code, variable storage, control logic, and software interfaces that allow the element to interact with other elements and with external interfaces.

The programmable processor 60 executes software and/or firmware that causes the programmable processor 60 to perform at least some of the processing described here as being performed by the altimeter 12. At least a portion of such software and/or firmware executed by the programmable processor 60 and any related data structures are stored in memory 62 during execution. Memory 62 comprises any suitable memory now known or later developed such as, for example, random access memory (RAM), read only memory (ROM), and/or registers within the programmable processor 60. In one implementation, the programmable processor 60 comprises a microprocessor, microcontroller, field programmable gate array (FPGA), or digital signal processor (DSP). In another implementation, the programmable processor 60 comprises processor support chips and/or system support chips such as ASICs. Moreover, although the programmable processor 60 and memory 62 are shown as separate elements in FIG. 1, in one implementation, the programmable processor 60 and memory 62 are implemented in a single device (for example, a single integrated-circuit device). Likewise, although the storage medium 79 and memory 62 are shown as separate elements in FIG. 1, in one implementation, the memory is incorporated in the storage medium 79. In one implementation of this embodiment, the storage medium 79 comprises more than one storage medium.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The methods and techniques described here may be implemented in digital electronic circuitry, or with a programmable processor (for example, a special-purpose processor or a general-purpose processor such as a computer) firmware, software, or in combinations of them.

In order for the altimeter 12 to determine the current altitude of the airborne vehicle 10 about the ground, the radio frequency transmitter 55 periodically emits a pulse of radio frequency signals referred to herein as "transmit pulses" or "emitted pulses" directed toward the terrain below the airborne vehicle. The period in which the pulse is emitted is referred to herein as a pulse repetition interval (PRI). Specifically, the time period between the start times of consecutively emitted pulses is the pulse repetition interval. Typically, the duty cycle of the transmit pulse is relatively small. For example, the duration of the emitted pulse can be about $\frac{1}{10}^{th}$ to $\frac{1}{100}^{th}$ of the pulse repetition interval. The radio frequency receiver 57 receives terrain echo signals reflected from the terrain. The programmable processor 60 executes the track gate control loop 70 to analyze the terrain echo signals and executes the level gate control loop 75 to analyze the terrain echo signals. The programmable processor 60 executes the noise gate control loop 76 to adjust to analyze the noise.

The track gate control loop 70 positions the track gate with respect to a terrain echo signal to maintain an amplitude at a selected reference amplitude. The level gate control loop 75 adjusts the gain of the transceiver via an automatic gain control in the programmable processor 60 so that the amplitude of terrain echo signal in the level gate is maintained at a fixed level. The noise gate control loop 76 positions the noise gate relative to the transmit pulse.

Figure 2A:
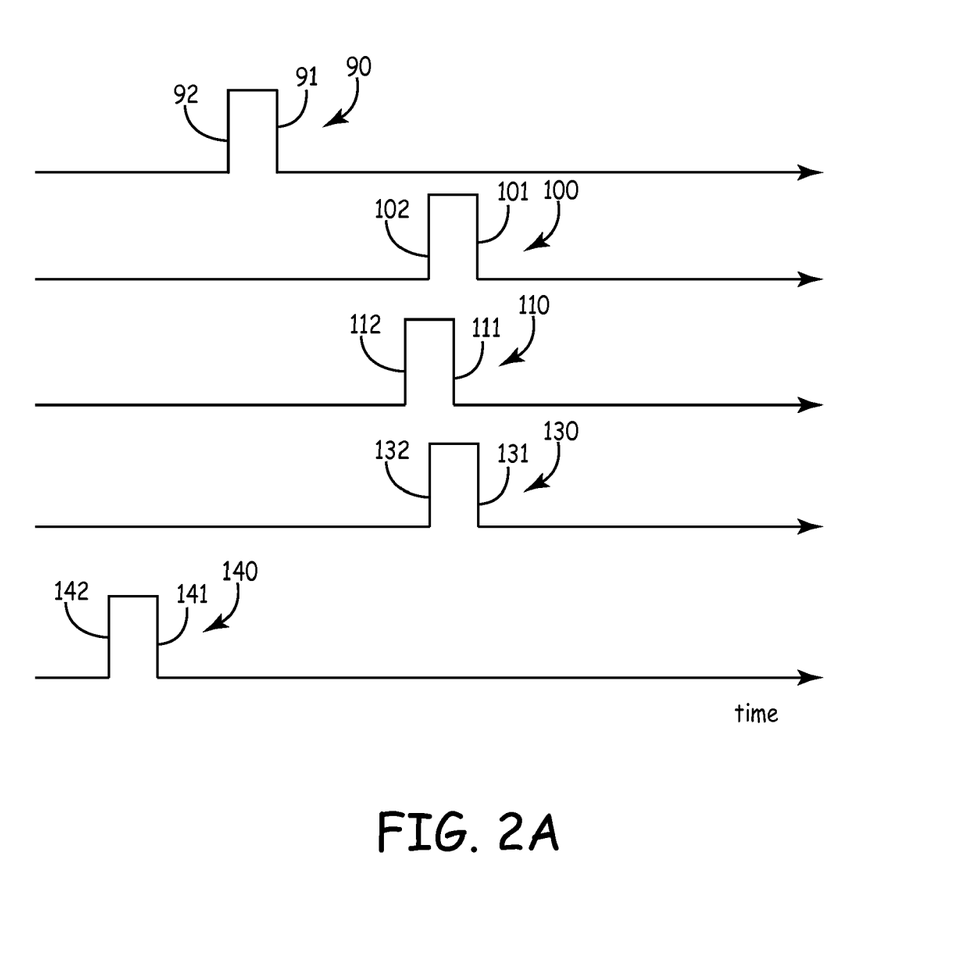
FIGS. 2A and 2B show relative positions of waveforms indicative of an ideal terrain echo signal, a track gate, a level gate and a noise gate during an exemplary pulse repetition interval in accordance with the present invention.
Figure 2B:
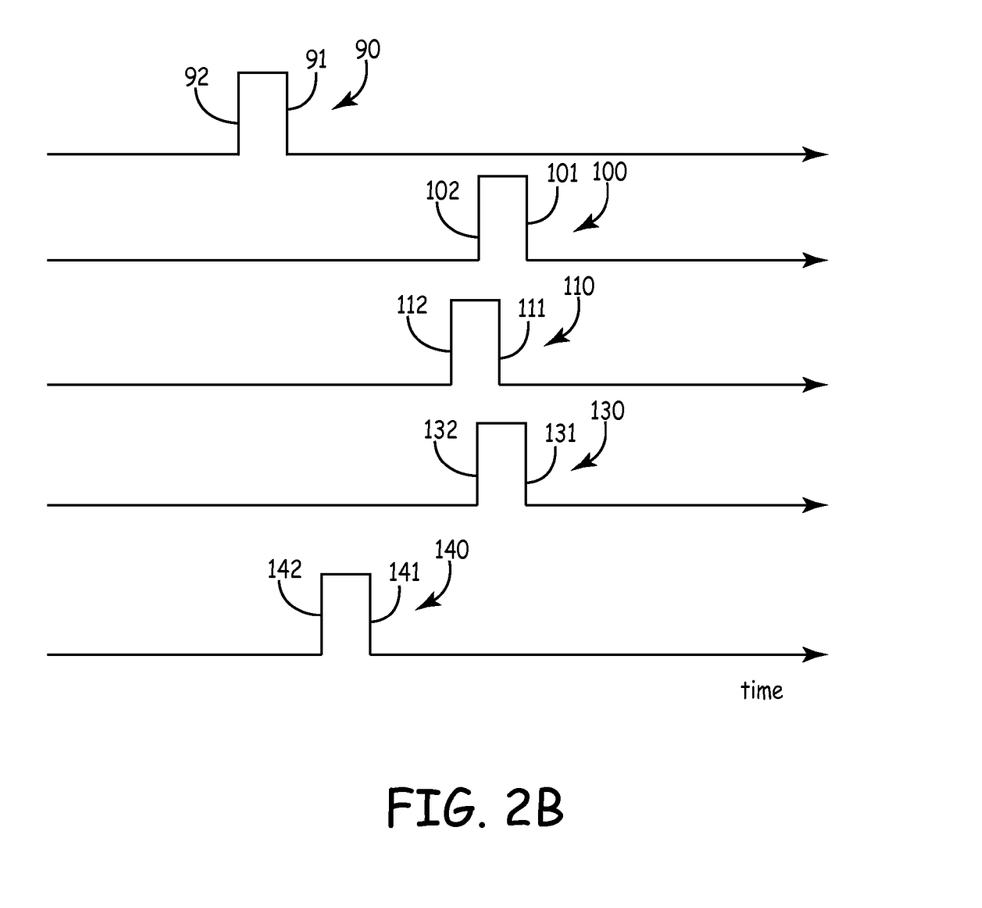

FIGS. 2A and 2B show relative positions of waveforms indicative of an ideal transmit pulse, an ideal terrain echo signal, a track gate, a level gate, and a noise gate during an exemplary pulse repetition interval (PRI) in accordance with the present invention. The transmit pulse represented generally by the numeral 90, the terrain echo signal represented generally by the numeral 100, track gate represented generally by the numeral 110, level gate represented generally by the numeral 130 and noise gate represented generally by the numeral 140 are shown versus a common time frame and are offset vertically from each other for clarity. The positions of the waveforms in time are referred to herein as "location." In the embodiment shown in FIG. 2A, the noise gate 140 is positioned to the inbound side of, i.e., preceding, the transmit pulse 90. In the embodiment shown in FIG. 2A, the noise gate 140 is positioned to the outbound side of, i.e., after, the transmit pulse 90.

The transmit pulse 90 is a square wave function having a rising edge 92 and a falling edge 91. The terrain echo 100 indicative of an ideal terrain echo signal for a point target is a square wave function having a rising edge 102 and a falling edge 101. The rising edge 102 and a falling edge 101 are representative of a rising edge of the terrain echo signal and a falling edge of the terrain echo signal detected at the radio frequency receiver 57 of altimeter 12 (FIG. 1). The track gate represented generally by the numeral 110 has a rising edge 112 and a falling edge 111. The level gate 130 has a rising edge 132 and a falling edge 131. As shown in FIGS. 2A and 2B, the level gate 130 and the track gate 110 are aligned with the terrain echo 100 as known in the art. As shown in FIGS. 2A and 2B, the noise gate 140 is located so that the center region of the noise gate (between the rising edge 142 and the falling edge 141) never overlaps with the rising edges 92, 102, 112 and 132 of the respective transmit pulse 90, the terrain echo 100, the track gate 110, and the level gate 130. Likewise, the noise gate 140 is located so that the center of the noise gate never overlaps with the falling edges 91, 101, 111 and 131 of the respective transmit pulse 90, the terrain echo 100, the track gate 110, and the level gate 130. In this manner, the noise gate 140 is always located in a position to only receive any interference noise that is incident on the radio frequency receiver 57.

Figure 3A:
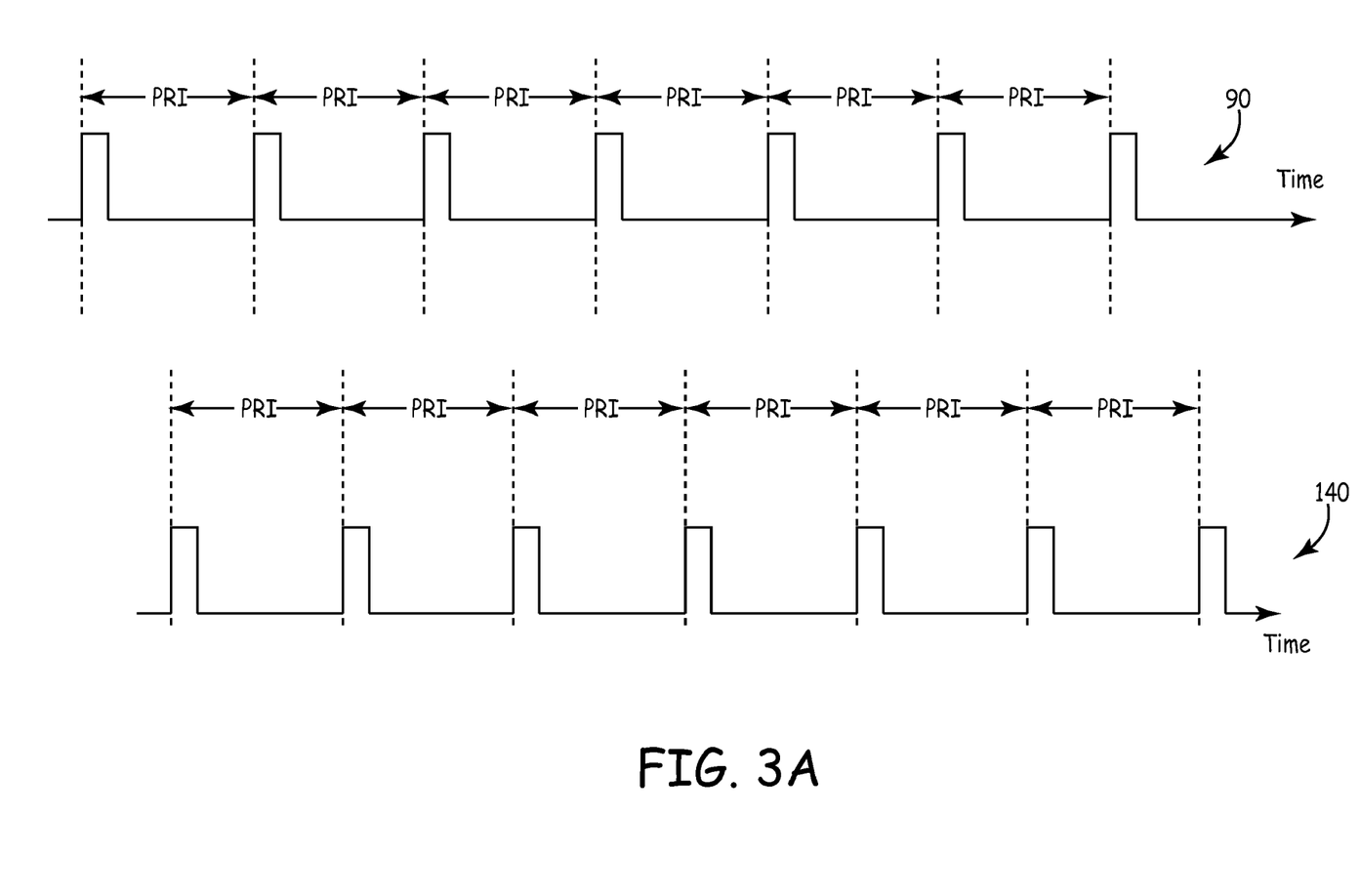
FIGS. 3A and 3B shows embodiments of waveforms indicative of ideal transmit pulses emitted every pulse repetition interval and noise gates for detecting noise every noise-level-detection period in accordance with the present invention.
Figure 3B:
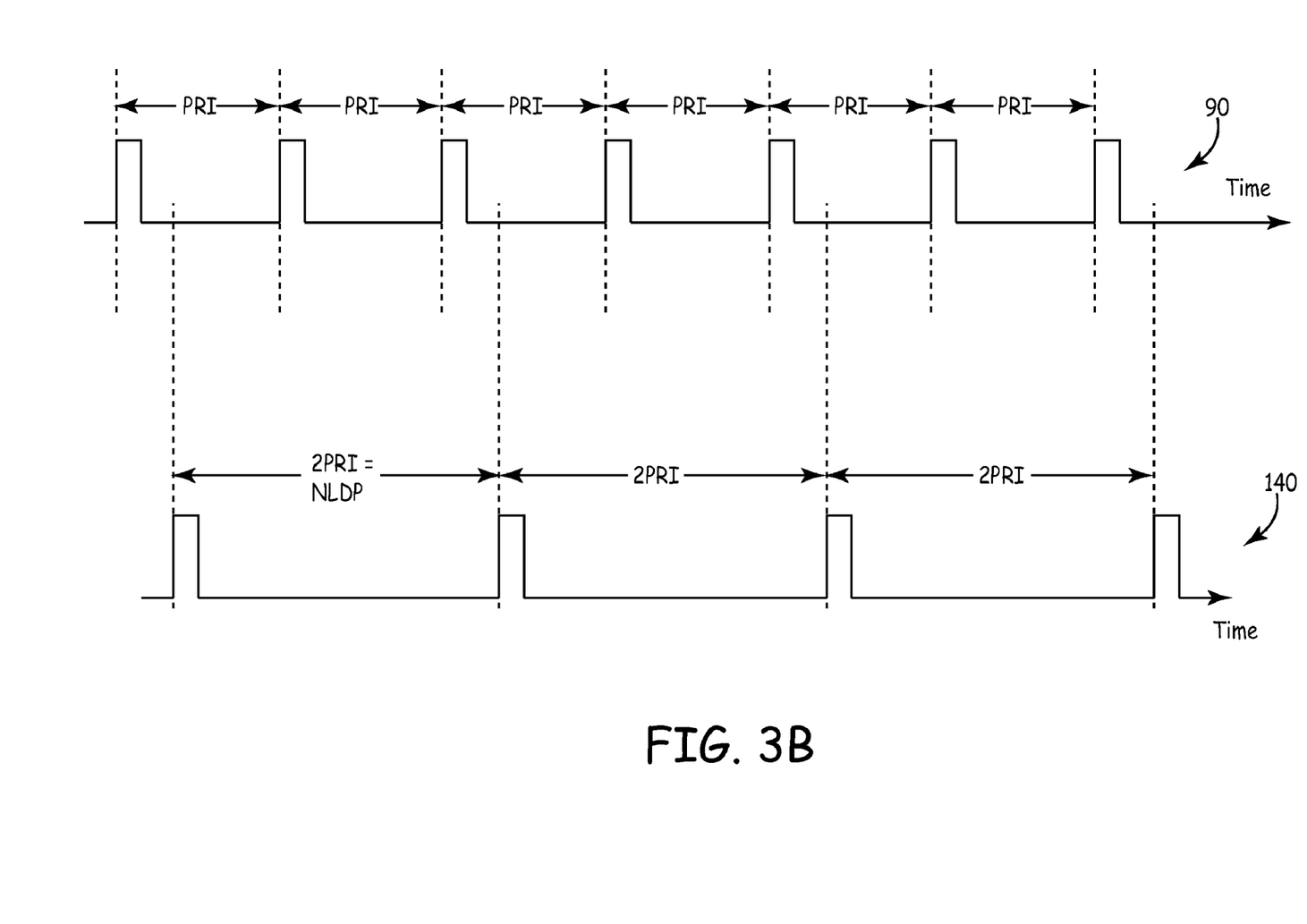

FIGS. 3A and 3B show embodiments of waveforms indicative of ideal transmit pulses 90 emitted every pulse repetition interval and noise gates 140 for detecting noise every noise-level-detection period in accordance with the present invention. The plurality of transmit pulses 90 and the plurality of noise gates 140 are shown versus a common time frame and are offset vertically from each other for clarity. As shown in FIG. 3A, the period of emitting the transmit pulse 90 is a pulse repetition interval (PRI) and the noise-level-detection period, in which the noise gate detects noise, is also the pulse repetition interval. As shown in FIG. 3B, the period of emitting the transmit pulse 90 is a pulse repetition interval (PRI) and the noise-level-detection period (NLDP) is two times the pulse repetition interval. In other implementations of this embodiment, the transmit pulse 90 is emitted every pulse repetition interval and the noise-level-detection period is a multiple integral of the pulse repetition interval.

Figure 4:
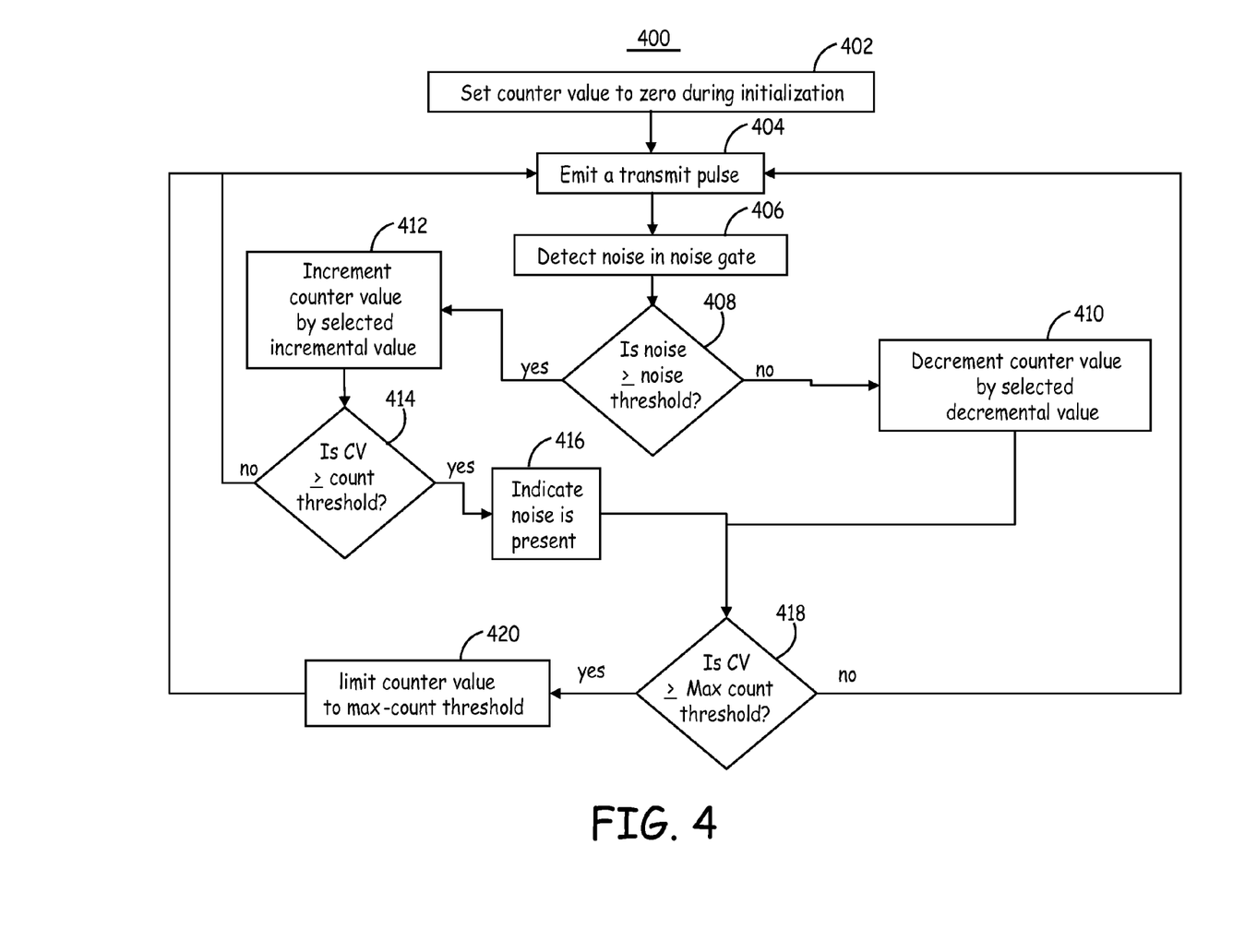
FIG. 4 is a flow diagram of one embodiment of a method to detect interference noise at a pulsed radar altimeter in accordance with the present invention.

FIG. 4 is a flow diagram of one embodiment of a method 400 to detect interference noise at a pulsed radar altimeter in accordance with the present invention. The method 400 is described with reference to the altimeter 12 shown in FIG. 1 and the waveforms shown FIGS. 2A and 2B although it is to be understood that method 400 can be implemented using other embodiments of the pulsed radar altimeter and other relative locations of the transmit pulse, the terrain echo, and the gates as is understandable by one skilled in the art who reads this document. The programmable processor 60 implements the method 400 once every pulse repetition interval if the pulse repetition interval is equal to the noise-level-detection period. The programmable processor 60 implements the method 400 once every noise-level-detection period if the noise-level-detection period is greater than the pulse repetition interval.

At block 402, the counter 61 is set to zero during an initialization of the altimeter 12. In one implementation of this embodiment, the initialization occurs prior to take off of the airborne vehicle 10. At block 404, the radio frequency transmitter 55 in the altimeter 12 periodically emits a transmit pulse 90 once every pulse repetition interval. If the noise-level-detection period is greater than the pulse repetition interval, the radio frequency transmitter 55 in the altimeter 12 periodically emits a transmit pulse 90 at block 404. For example, if the noise-level-detection period is three times greater than the pulse repetition interval, the radio frequency transmitter 55 in the altimeter 12 emits three transmit pulses 90 at block 404 while the blocks 406-420 are being implemented. Likewise, if the noise-level-detection period equals the pulse repetition interval, the radio frequency transmitter 55 in the altimeter 12 emits one transmit pulse 90 at block 404 and then the blocks 406-420 are implemented.

At block 406, the radio frequency receiver 57 periodically detects noise in a noise gate 140. The radio frequency receiver 57 detects noise in a noise gate 140 once every noise-level-detection period. In one implementation of this embodiment, the duration of the noise-level-detection period equals the duration of the pulse repetition interval (FIG. 3A). In another implementation of this embodiment, the duration of the noise-level-detection period equals integral multiples of the duration of the pulse repetition interval (FIG. 3B). In yet another implementation of this embodiment, the noise level detection period is not a specific multiple of the transmit pulse repetition interval and is asynchronously measured based on the system design.

In one implementation of this embodiment, information indicative of the level of the noise is sent from the radio frequency receiver 57 to the programmable processor 60. In another implementation of this embodiment, the programmable processor 60 determines the noise level using filters algorithms that are applied to the signals received from the radio frequency receiver 57. In an exemplary case, the filters algorithms include low-pass filters, high pass filters and/or band pass filters. As defined herein, the periodic detection of noise in a noise gate encompassed all filtering performed in the radio frequency receiver and/or the programmable processor after the gating process in addition to the detection of the noise at the radio frequency receiver.

At block 408, the programmable processor 60 determines if the noise level detected during each noise-level-detection period exceeds a noise threshold. In one implementation of this embodiment, the programmable processor 60 determines if the difference between a last received noise level and a second-to-last received noise level exceeds the noise threshold. In another implementation of this embodiment, the programmable processor 60 determines if the last received noise level exceeds the noise threshold. In yet another implementation of this embodiment, the programmable processor 60 determines if the difference between a last received noise level and an average of the second-to-last and third-to-last received noise levels exceeds the noise threshold. Other methods for setting the noise threshold can be used.

If the programmable processor 60 determines that the noise level during a given noise-level-detection period is less than the noise threshold, the flow proceeds to block 410. At block 410, the programmable processor 60 decrements the counter value in the counter 61 by a selected decremental value for that noise-level-detection period. The programmable processor 60 continues to decrement the counter value in the counter 61 by the selected decremental value for every noise-level-detection period. In one implementation of this embodiment, the counter value is not allowed to remain below zero and programmable processor 60 continues to decrement the counter value in the counter 61 by the selected decremental value for every noise-level-detection period until the counter value equals zero or is less than zero. In this case, if the counter value falls below zero during a decrement, the counter value is reset to be equal to zero. In another implementation of this embodiment, the programmable processor 60 continues to decrement the counter value in the counter 61 by the selected decremental value for every noise-level-detection period even after the counter value equals zero or a negative value. The decremental value is stored in the memory 62.

If the programmable processor 60 determines that the noise level during a given noise-level-detection period exceeds the noise threshold, the flow proceeds to block 412. At block 412, the programmable processor 60 increments the counter value by a selected incremental value for that noise-level-detection period. The selected incremental value is stored in memory 62.

At block 414, the programmable processor 60 determines if the counter value (CV) is greater than a count threshold. The count threshold is stored in the memory 62. If the programmable processor 60 determines that the counter value is less than the count threshold, the flow proceeds back to block 404 and a transmit pulse is emitted during the next pulse repetition interval.

If at block 414 the programmable processor 60 determines that the counter value is greater than the count threshold, the flow proceeds to block 416. At block 416, the programmable processor 60 indicates that an interference noise is present. For every noise-level-detection period that follows in which the counter value exceeds the count threshold, the programmable processor 60 continues to indicate that the noise is present.

In an exemplary embodiment, the selected incremental value is 500, the count threshold is 2000, and the selected decremental value is 2. In this case, if the noise detected in the noise gate exceeds the noise threshold five times in a row, the counter value in the counter 61 is at least 2500. It will take at least 250 noise-level-detection periods without noise being detected in the noise gate for the counter value to drop below the count threshold. During this time the programmable processor 60 will be indicating that the noise is present.

At block 418, the programmable processor 60 determines if the counter value exceeds a maximum-count threshold. The maximum-count threshold is stored in the memory 62. The altimeter 12 includes a maximum-count threshold in order to keep from having to decrement from too high a value. If the counter value goes too high during an extended interference event, the time required to decrement the counter 61 back to a value under the noise threshold may be excessive. Using the exemplary embodiment in which the selected incremental value is 500, the count threshold is 2000, and the selected decremental value is 2, if there were 20 interference hits on the altimeter 12 in a row, the counter value would reach 20 time 500 or 10,000. After the event was over it would take 5,000 noise-level-detection periods without noise being detected in the noise gate for the counter value to drop below the count threshold. In one implementation of this embodiment, selected incremental value is 500, the count threshold is 2000, the selected decremental value is 2, and the maximum-count threshold is 3000.

If the programmable processor 60 determines that the counter value does not exceed a maximum-count threshold at block 418, the flow proceeds to block 404. If the programmable processor 60 determines that the counter value does exceed a maximum-count threshold at block 418, the flow proceeds to block 420.

At block 420, the programmable processor 60 limits the counter value to a maximum-count threshold. The programmable processor 60 decreases the counter value to the maximum-count threshold if it is in excess of the maximum-count threshold after the counter value is incremented by the selected incremental value at block 412. If the counter value equals the maximum-count threshold, the programmable processor 60 does not increment the counter 61 by the selected incremental value if there is noise detected in the noise gate during the next noise-level-detection period. When the counter value is between the count threshold and the maximum-count threshold and the detected noise level during a noise-level-detection period is less than the noise threshold, the programmable processor 60 continues to decrement the counter value by the selected decremental value. When the counter value is between the count threshold and the maximum-count threshold and the detected noise level during a noise-level-detection period is greater than the noise threshold, the programmable processor 60 increments the counter value by either the selected incremental value or the difference between a current counter value and the maximum-count threshold. In this manner the programmable processor 60 limits the counter value to the maximum-count threshold.

Figure 5:
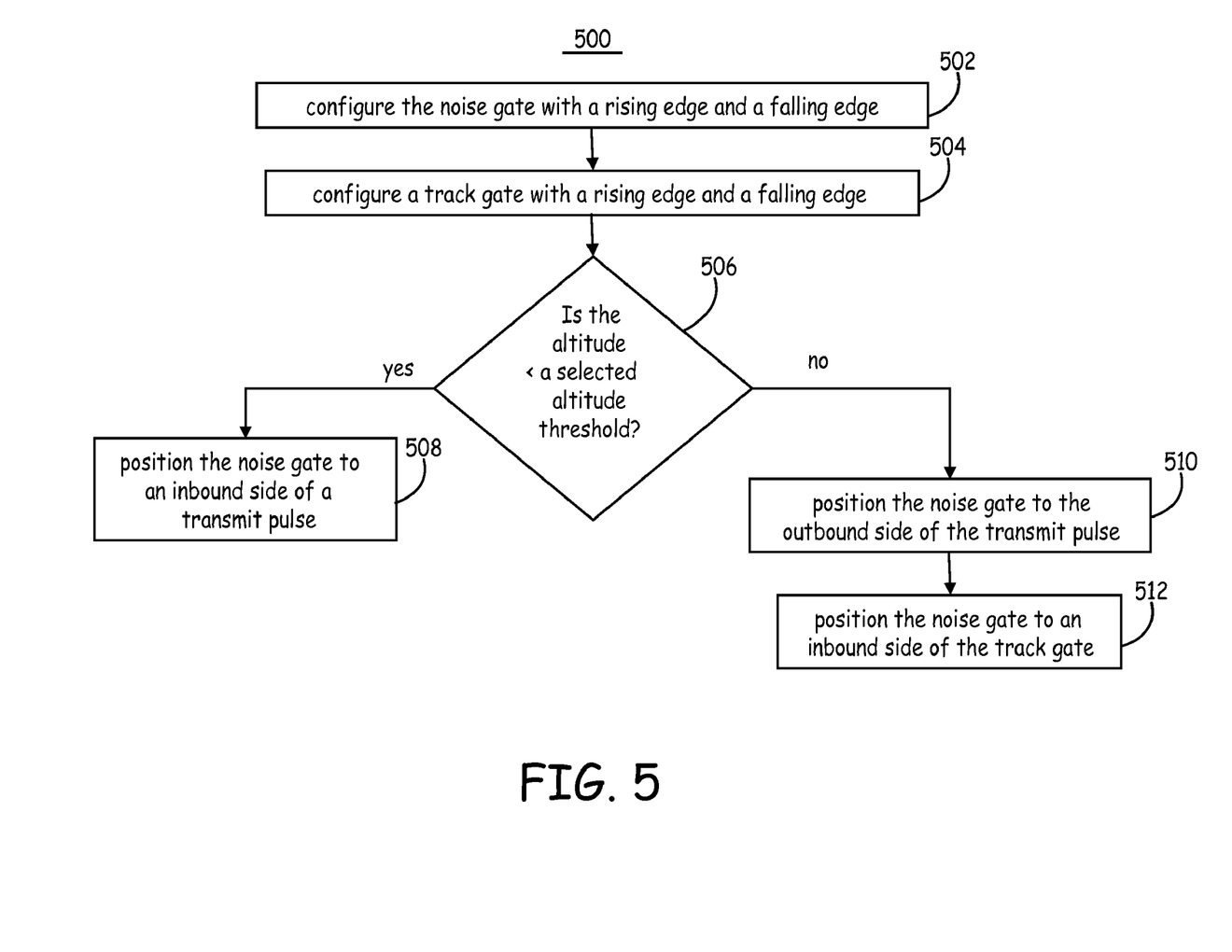
FIG. 5 is a flow diagram of one embodiment of a method to position a noise gate relative to a transmit pulse in accordance with the present invention.

FIG. 5 is a flow diagram of one embodiment of a method 500 to position a noise gate relative to a transmit pulse 90 in accordance with the present invention. The method 500 is described with reference to the altimeter 12 shown in FIG. 1 and the waveforms shown FIGS. 2A and 2B although it is to be understood that method 500 can be implemented using other embodiments of the pulsed radar altimeter and other relative locations of the transmit pulse, the terrain echo, and the gates as is understandable by one skilled in the art who reads this document. The programmable processor 60 implements the method 500 either once every pulse repetition interval or after a few pulse repetition intervals.

At block 502, the programmable processor 60 configures the noise gate 140 with a rising edge 142 and a falling edge 141. At block 504, the programmable processor 60 configures a track gate 110 with a rising edge 112 and a falling edge 111. The rising edge 112 of the track gate 110 is to an outbound side of the transmit pulse 90.

At block 506, the programmable processor 60 determines if the altitude measured by the radar altimeter 12 is less than a selected altitude threshold. The selected altitude threshold is stored in the memory 62. If the programmable processor 60 determines the measured altitude is less than the selected altitude threshold, the programmable processor 60 positions the noise gate to an inbound side of a transmit pulse 90 as shown in FIG. 2A. If the programmable processor 60 determines the measured altitude is greater than the selected altitude threshold, the programmable processor 60 positions the noise gate to an outbound side of a transmit pulse 90 (block 510) and to an inbound side of the track gate 110 (block 512) as shown in FIG. 2B.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of detecting interference noise at a radar altimeter, the method comprising:
   periodically emitting a pulse from the pulsed radar altimeter, wherein the time period between the start times of consecutively emitted pulses is a pulse repetition interval;
   periodically detecting a noise level in a noise gate, the noise gate being offset from other gates in the altimeter;
   determining if the noise level detected during each noise-level-detection period exceeds a noise threshold;
   if the noise level detected during a noise-level-detection period is greater than the noise threshold, incrementing a counter value by a selected incremental value for that noise-level-detection period; and
   determining if the counter value is greater than a count threshold.

2. The method of claim 1, further comprising:
   indicating that an interference noise is present while the counter value exceeds the count threshold.

3. The method of claim 2, further comprising:
   if the noise level detected during a noise-level-detection period is less than the noise threshold, decrementing the counter value by a selected decremental value for that noise-level-detection period until the counter value is equal to or less than zero.

4. The method of claim 3, further comprising:
   determining if the counter value is greater than or equal to a maximum-count threshold; and
   limiting the counter value to the maximum-count threshold based on the determination that the counter value is greater than or equal to a maximum-count threshold.

5. The method of claim 4, further comprising:
   while the counter value is between the count threshold and the maximum-count threshold,
   continuing to decrement the counter value by the selected decremental value for each noise-level-detection period during which the noise level is less than the noise threshold; and
   incrementing the counter value by one of the selected incremental value, and a difference between a current counter value and the maximum-count threshold for each noise-level-detection period during which the noise level is greater than the noise threshold.

6. The method of claim 1, further comprising:
   setting the counter to zero during an initialization.

7. The method of claim 1, wherein periodically detecting a noise level in a gated region comprises:
   configuring the noise gate with a rising edge and a falling edge;
   when an altitude measured by the radar altimeter is less than a selected altitude threshold, positioning the noise gate to an inbound side of a transmit pulse.

8. The method of claim 7, further comprising:
   configuring a track gate with a rising edge and a falling edge wherein the rising edge of the track gate is to an outbound side of the transmit pulse, and wherein when the altitude measured by the radar altimeter is greater than the selected altitude threshold, the method further comprises:

positioning the noise gate to the outbound side of the transmit pulse; and positioning the noise gate to an inbound side of the track gate.

9. The method of claim 1, further comprising:

setting the noise-level-detection period to be equal to the pulse repetition interval.

10. An interference detecting pulsed radar altimeter, comprising:

a radio frequency receiver gated to periodically detect an intensity at a noise gate;

a counter communicatively coupled to the radio frequency receiver, the counter operable to increment by a selected increment value if the intensity detected in the noise gate exceeds a noise threshold; and a programmable processor communicatively coupled to the counter, the programmable processor operable to determine if a counter value exceeds a count threshold and further operable to adjust at least one parameter of the pulsed radar altimeter if the counter value exceeds the count threshold.

11. The interference detecting pulsed radar altimeter of claim 10, further comprising:

a memory to store the noise threshold value and the count threshold, the memory communicatively coupled to the programmable processor and the counter.

12. The interference detecting pulsed radar altimeter of claim 10, further comprising:

a radar pulse transmitter, wherein the radio frequency receiver is gated to detect noise at a point in time that is offset from the pulse transmission.

13. The interference detecting pulsed radar altimeter of claim 12, further comprising:

a track gate, wherein the radio frequency receiver is gated to detect noise at a point in time that is offset from the track gate.

14. A program product comprising program instructions, embodied on a storage medium, that are operable to cause a programmable processor to:

periodically determine if a noise level detected during each noise-level-detection period exceeds a noise threshold;

if the noise level detected during a noise-level-detection period is greater than the noise threshold, increment a counter value by a selected incremental value for that noise-level-detection period; and determine if the counter value is greater than a count threshold.

15. The program product of claim 14, further comprising instructions operable to cause the programmable processor to:

indicate that an interference noise is present while the counter value exceeds the count threshold.

16. The program product of claim 15, further comprising instructions operable to cause the programmable processor to:

decrement the counter value by a selected decremental value for that noise-level-detection period until the counter value is equal to or less than zero if the noise level detected during a noise-level-detection period is less than the noise threshold.

17. The program product of claim 16, further comprising instructions operable to cause the programmable processor to:

determine if the counter value is greater than or equal to a maximum-count threshold; and limit the counter value to the maximum-count threshold based on the determination that the counter value is greater than or equal to a maximum-count threshold.

18. The program product of claim 14, further comprising instructions operable to cause the programmable processor to:

while the counter value is between the count threshold and the maximum-count threshold, continue to decrement the counter value by the selected decremental value for each noise-level-detection period during which the noise level is less than the noise threshold; and increment the counter value by one of the selected incremental value, and a difference between a current counter value and the maximum-count threshold for each noise-level-detection period during which the noise level is greater than the noise threshold.

19. The program product of claim 14, further comprising instructions operable to cause the programmable processor to:

configure the noise gate with a rising edge and a falling edge;

position the noise gate to an inbound side of a transmit pulse when an altitude measured by the radar altimeter is less than a selected altitude threshold.

20. The program product of claim 19, further comprising instructions operable to cause the programmable processor to:

configure a track gate with a rising edge and a falling edge wherein the rising edge of the track gate is to an outbound side of the transmit pulse, and wherein when the altitude measured by the radar altimeter is greater than the selected altitude threshold, the method further comprises:

position the noise gate to the outbound side of the transmit pulse; and position the noise gate to an inbound side of the track gate.

* * * * *